E. G. DAVIS.
NUT LOCK.
APPLICATION FILED JAN. 2, 1913.

1,070,946.

Patented Aug. 19, 1913.

WITNESSES

INVENTOR
Edward G. Davis,
BY
ATTORNEYS

UNITED STATES PATENT OFFICE.

EDWARD G. DAVIS, OF JEFFERSONVILLE, INDIANA.

NUT-LOCK.

1,070,946.

Specification of Letters Patent. Patented Aug. 19, 1913.

Application filed January 2, 1913. Serial No. 739,632.

*To all whom it may concern:*

Be it known that I, EDWARD G. DAVIS, a citizen of the United States, and a resident of Jeffersonville, in the county of Clark and State of Indiana, have invented a new and Improved Nut-Lock, of which the following is a full, clear, and exact description.

My invention, although applicable generally to the locking of nuts on machinery and mechanical devices, is more especially intended for use in locking the nuts of rail joints.

It is a design of my invention to provide an improved nut lock device which may be readily applied and removed, and which when in place will unfailingly hold the nut against accidental loosening.

In carrying out the practical embodiment of the invention, a nut-locking washer is employed, having a polygonal eye adapted to embrace the nut, and a second relatively-fixed bolt washer formed to engage the adjacent fishplate or other adjacent element to hold the bolt-washer against turning, the respective washers having mating formations or elements to lock and interlock with each other by turning movements of the nut and its washer relatively to the bolt washer.

The distinguishing features of my invention will be further elucidated and the important structural elements characterizing the practical embodiment, which is illustrated as an example, will be more particularly explained in the specific description hereinafter to be given.

Reference is to be had to the accompanying drawings forming a part of this specification, in which similar characters of reference indicate corresponding parts in all the views.

Figure 1:
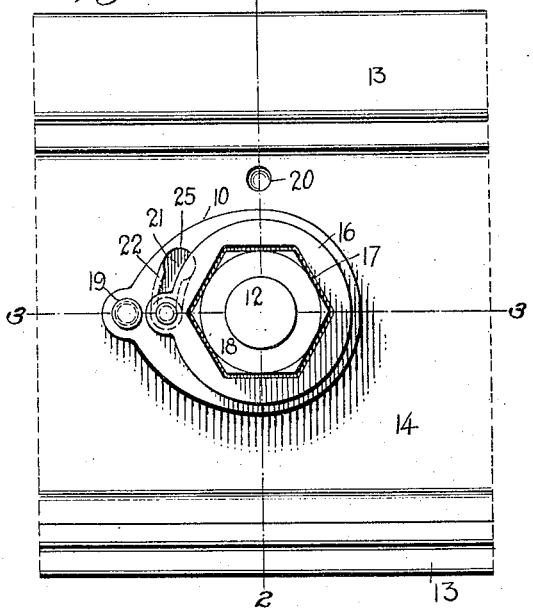
Figure 2:
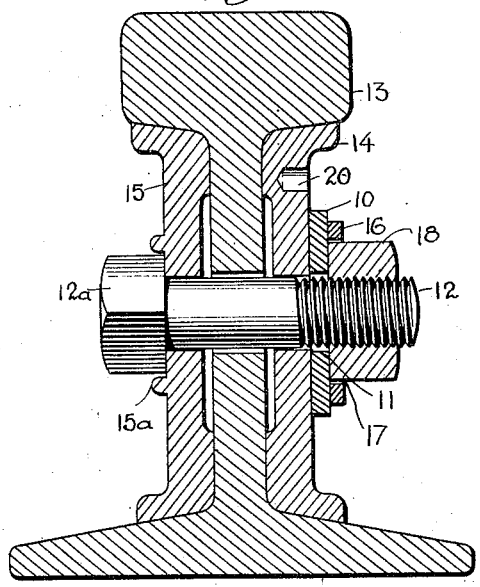
Figure 3:
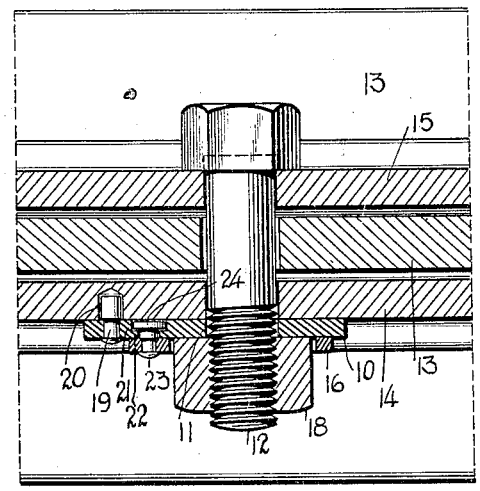
Figure 4:
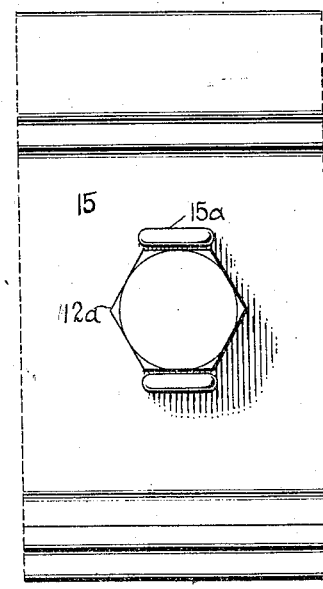
Figure 5:
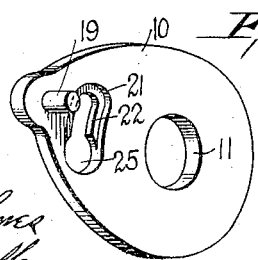

Figure 1 is a face view showing my invention applied to a railway joint; Fig. 2 is a vertical transverse section on the line 2—2 of Fig. 1; Fig. 3 is a horizontal section on the line 3—3 of Fig. 1; Fig. 4 is a view of the opposite side of the joint from that illustrated in Fig. 1; and Fig. 5 is a perspective view of the bolt-washer forming part of the device.

In carrying out my invention as applied to a railway joint, a washer 10 is formed with an eye 11 to adapt the washer to be slipped over the threaded shank of an ordinary bolt 12, the bolt in practice passing through a rail 13 and fishplates 14, 15. A second washer 16, has a polygonal eye 17, corresponding with the polygonal formation of the nut 18, so that the nut washer may be slipped over the nut, to embrace the same snugly and to be caused to turn therewith.
Provision is made for holding the bolt washer 10 against turning, and for this purpose, in the present instance, I have illustrated the said washer as provided with a pin 19 projecting from its inner surface and adapted to be engaged in one of two recesses or sockets 20 in the adjacent fishplate 14, or other element occupying a similar position relatively to the washer in any other machine to which the nut lock is to be applied. These sockets 20 are spaced 90° apart, and the pin 19 (which may be a separate pin driven tightly into the washer 10, or a cast pin,) thus has some range of adjustment relatively to the positions of the angles of the nut 18, when the latter is tightened up or substantially so.

The mating formations are provided on the respective washers as follows: In the bolt washer 10 an arcuate opening 21 is formed which may extend through or partially through the washer and is undercut, as clearly indicated in Figs. 1 and 3 for a portion of the length of the said recess to produce overhanging side walls 22 extending from an end of the slot to terminate short of the opposite end; the result of producing the described opening is to give the opening the form of a keyhole slot. In this keyhole slot there is received the flanged or headed stud 23, carried by the nut washer 16, the flanged head 24 of the stud being adapted to pass through the upper round end 25 of the keyhole slot, and then to be turned backward for the said flanged head to engage beneath the overlying flanges 22.

In practice, the bolt 12 having been passed through the fishplates and rail, the bolt washer 10 is slipped over the threaded end of the bolt against the outer face of the adjacent fishplate 14, with the pin 19 of said washer in a recess 20 of said fishplate. The nut 18 is now placed on the bolt and turned to a degree of tightness against the washer 10 to hold the fishplates in proper position.
The nut-locking washer 16 is then placed on the nut 18, with the flanged head 24 of the pin 23 in the enlarged end 25 of the keyhole slot. The nut is now turned backward a partial turn, sufficiently to carry the nut washer 16 with it, and thus bringing the head 24 of the pin 23 under the overhanging flanges 22. It is to be understood that the fishplates 14 and 15 have a certain spring and furthermore, that the metal parts have more or less give and yieldingness, sufficient to allow for the substantial tightening up of the nut 18 and the turning back of the nut as described without such turning back resulting in any looseness of the parts. It will be observed that when the bolt is in place, the head 12ª thereof is received between lugs 15ª on the adjacent face of the fishplate 15, whereby the bolt will be preventing from turning. Any other suitable means may be provided to hold the bolt against turning with the nut. To remove the nut it is necessary only to give it a partial turn to the right, to bring the head 24 of the pin 23 into register with the end 25 of the keyhole slot, whereby the nut-locking washer 16 may be removed axially.

The described construction affords a practical means for carrying my invention into effect, in a simple manner, and I would state in conclusion, that I do not limit myself strictly to the mechanical details herein illustrated, since manifestly the same can be considerably varied within the scope of the claim without departure from the spirit of the invention.

Having thus described my invention, I claim as new, and desire to secure by Letters Patent:

The combination, with a bolt and nut, and elements to be clamped thereby, said elements presenting a member for holding the bolt against turning, of a bolt washer, said washer having a pin, and the adjacent elements to be clamped having recesses spaced about 90° apart, adapted to receive said pin, whereby said washer will be held against turning, a nut-locking washer having a polygonal eye to conform to the nut to be locked, and to cause the washer to turn with said nut, the bolt-washer having an arcuate keyhole slot with overhanging walls at the contracted portion of the slot, the nut-locking washer having a headed pin adapted for movement in said keyhole slot.

In testimony whereof I have signed my name to this specification in the presence of two subscribing witnesses.

EDWARD G. DAVIS.

Witnesses:
NEVASTON F. DAVIS,
WILMER T. FOX.

---

Copies of this patent may be obtained for five cents each, by addressing the "Commissioner of Patents Washington, D. C."